Dec. 17, 1968  W. G. LIVEZEY  3,416,308
VARIABLE POWER AND VARIABLE DIRECTION ENGINE AND COMPOUND
PLANETARY PHASE CHANGING DEVICE
Filed May 5, 1967  2 Sheets-Sheet 1

INVENTOR.
William G. Livezey
BY
Ronald L. Phillips
ATTORNEY

Dec. 17, 1968 W. G. LIVEZEY 3,416,308
VARIABLE POWER AND VARIABLE DIRECTION ENGINE AND COMPOUND
PLANETARY PHASE CHANGING DEVICE
Filed May 5, 1967 2 Sheets-Sheet 2

INVENTOR.
*William G. Livezey*
BY
*Ronald L. Phillips*
ATTORNEY

United States Patent Office 3,416,308
Patented Dec. 17, 1968

3,416,308
VARIABLE POWER AND VARIABLE DIRECTION ENGINE AND COMPOUND PLANETARY PHASE CHANGING DEVICE
William G. Livezey, Indianapolis, Ind., assignor to General Motors Corporation, Detroit, Mich., a corporation of Delaware
Filed May 5, 1967, Ser. No. 636,405
1 Claim. (Cl. 60—24)

ABSTRACT OF THE DISCLOSURE

A hot gas energy transforming device operating with the Stirling cycle has a phase changing device employing a compound planetary drive connecting the engine's power mechanism to its displacer mechanism. A pair of like planetary drive sets are compounded to provide the compound drive which is controlled by a servomotor to fix and vary the phase relation between the power and displacer mechanisms.

---

Figure 1:
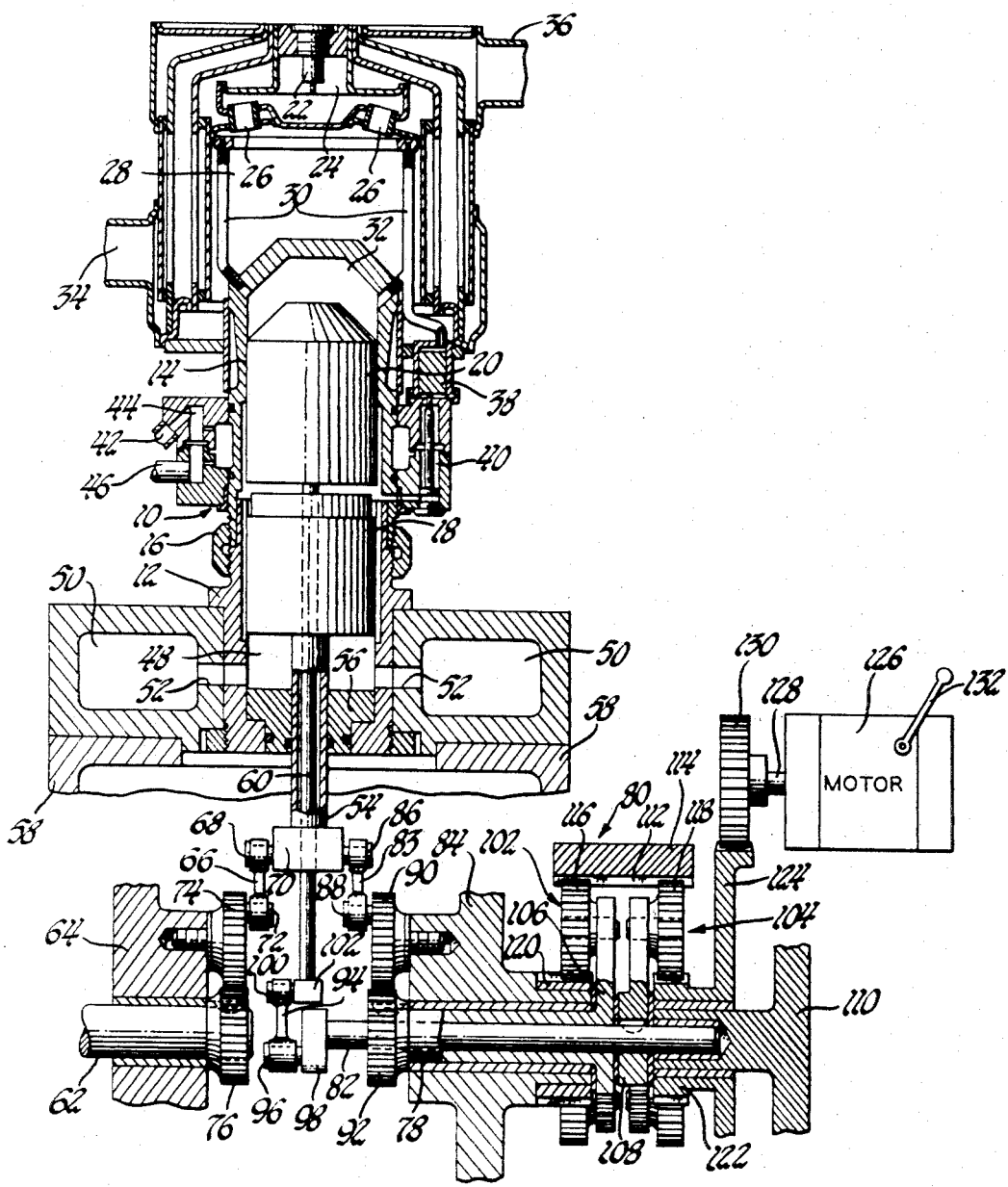

This invention relates to a variable power and variable direction hot gas energy transforming device having a phase changer and more particularly to a planetary phase changer employing compound planetary drive and to said drive.

In the Stirling cycle engine, which is a typical form of hot gas energy transforming device, there is generally provided a power piston and a displacer piston powered by the power piston. The engine is usually constructed in such a manner that with a predetermined and fixed phase angle between the power and displacer pistons, maximum engine power is obtained. This predetermined phase angle may be 90°, for example, and from a constructional point of view a larger phase angle may be impossible because of clearance between the power piston and the displacer piston; however, a smaller phase angle is possible. As the phase angle approaches zero, the engine power approaches zero and if the phase angle becomes negative, the engine power output take-off is caused to rotate in the opposite direction with the engine developing corresponding power values at corresponding phase angles. Thus, by changing the pistons' phase relation, it is possible to control the engine's power output from zero to maximum power and also to change the output drive direction.

The power required to change the phase relation can impose a considerable power requirement on the phase changing device which is additive to the normal power transmitting ability required of a phase changer which serves as a full displacer power transmitting link. The power requirements of the phase changer change with the power rating of the engine and it is desirable to provide a phase changer to meet the various power requirements with minimum torque and speed levels in the phase changer. In addition, it is desirable to keep the size, weight and cost of the phase changer at a minimum and life at a maximum. The provision of a phase changer which will vary the Stirling cycle engine output power and drive direction while meeting the above conditions will substantially enhance the engine's usage and mass production possibilities.

In the present invention the hot gas engine has a phase changing device employing a compound planetary drive train which drivingly connects the engine's power mechanism to the displacer mechanism and provides for fixing and varying the phase relation therebetween. The phase changing device offers a plurality of compound planetary drive arrangements in the hot gas engine to afford latitude in meeting the displacer power, torque and speed requirements of a particular engine. This is accomplished by the planetary phase changing device comprising a pair of like or equal speed ratio planetary drive sets with one pair of like planetary drive members drivingly connected to the engine's power and displacer mechanisms and another pair of like planetary drive members connected. One member of the remaining third pair of like planetary drive members is grounded and the other planetary drive member of this pair is connected to a servomotor. The servomotor is operable to hold the connected planetary drive member to fix the phase relation between the power and the displacer mechanisms and is also operable to drive the connected planetary drive member in either direction to elect a change in phase relation between the power and displacer mechanisms.

An object of the present invention is to provide a variable power and variable direction hot gas engine having an improved phase changer.

Another object is to provide a hot gas engine having a compound planetary drive phase changer for fixing and changing phase with low internal torque and speed levels.

Another object is to provide a hot gas engine having a phase changer employing a pair of compounded equal ratio planetary drive sets controlled by a servomotor to fix the phase relation of the engine's power and displacer mechanisms and to change the phase's relation to change the engine output power and drive direction.

Another object is to provide a compound planetary phase changer employing a pair of equal ratio planetary drives sets in which the phase relation between like input and output planetary drive members is controlled by connecting a second pair of like planetary drive members and in the third pair of like planetary drive members connecting one member to ground and the other member to a servomotor which is operable to hold the connected member to provide a 1:1 speed ratio drive between the input and output members and is also operable to drive the connected member in either direction to increase or decrease the phase angle between the input and output members.

These and other objects of the invention will be more apparent from the following description and drawing in which:

FIGURE 1 is a fragmentary cross-sectional view of a typical hot gas energy transforming device in which the phase changing device according to the present invention is employed.

FIGURES 2 through 6 diagrammatically show five other embodiments of the phase changing device according to the present invention.

Referring to the drawing, FIGURE 1 illustrates one form of the invention, a hot gas energy transforming device in the form of a Stirling cycle engine having a compound planetary phase changing device. The engine has a cylinder 10 which may be formed in any suitable fashion and for illustrative purposes is shown to include a lower portion 12 and an upper portion 14 secured together by threaded ring 16. A power piston 18 is received in the cylinder 10 beneath a displacer piston 20 as in the usual construction. A burner nozzle 22 extends into a preoxidation chamber 24 which is connected by swirl passages 26 to the burner combustion chamber 28. Suitable heater tubes 30 in the combustion chamber 28 communicate with the expansion chamber 32 in the cylinder 10 above the displacer piston 20. An air inlet 34 delivers air to the combustion chamber and an exhaust outlet 36 delivers the air and products of combustion from the chamber. A suitable regenerator 38 and cooler 40 are disposed adjacent the cylinder 10 for passage of the operating fluid from one end of the cylinder 10 to the other end in the usual manner. A coolant inlet passage 42 conveys coolant to an annular chamber 44 communicating with the cooler 40 and a coolant outlet 46 conveys the coolant from the engine. A buffer space 48 is provided in cylinder 10 beneath the power piston 18 and in communication with an annular chamber 50 through suitable passages 52.

Power piston 18 is provided with a hollow piston rod 54 which is secured to the underside of the power piston and extends axially therefrom through a sealed closure member 56 and into the engine frame 58 which supports cylinder 10. The power piston 18 is provided with a central axial bore to permit the passage of a displacer piston rod 60 which extends axially from its connection to the underside of the displacer piston 20 through the power piston 18 and through the hollow piston rod 54 into the engine frame. This reciprocating structure is all symmetrical and coaxial about the central axis of the cylinder. The engine construction thus far described is all well known and is the usual manner of constructing an engine to operate using the Stirling cycle with the engine power also being used to power the displacer via a suitable drive connection between the power and displacer pistons.

The power piston 18 is connected to drive the engine's output shaft 62 which is journaled in the web 64 of the engine frame at right angles to the central axis of the engine cylinder. The drive connection between the power piston 18 and the engine's output shaft 62 is provided by an oscillatory connecting rod 66 which is journaled at its upper end on a pin 68 secured to a collar 70 on the lower end of the power piston's reciprocating connecting rod 54. Connecting rod 66 is journaled at its lower end on a pin 72 secured to an idler gear 74 journaled on the frame web 64, the crank pin 72 being located a substantial distance from the axis of rotation of the idler gear to permit driving of idler gear 74 by connecting rod 66 in a conventional manner. Idler gear 74 meshes with a gear 76 keyed to the engine output shaft 62 to complete the drive thereto.

According to the present invention the engine has a phase changing device providing a controlled compound planetary drive between the power piston 18 and the displacer piston 20 for fixing tnd varying their phase relation or relative phase angle. The phase changer comprises a power piston driven sleeve shaft 78 connected by compound planetary gearing generally designated at 80 to drive a crankshaft 82 which is connected to drive the displacer piston. The axes of the phase changer's input and output shafts 78 and 82 are aligned with the axis of the engine output shaft 62, the sleeve shaft 78 being suitably journaled on an engine frame web 84 and the shaft 82 being journaled in the hollow shaft 78.

The drive connection between the power piston and the phase changer's input shaft is identical in structure to and has the same speed ratio and drive direction as the connection between the power piston and the engine output shaft and comprises an oscillatory connecting rod 83 which is journaled at its upper end on a pin 86 secured to the power piston's connecting rod collar 70 diametrically opposite pin 68. Rod 83 is journaled at its lower end on a crank pin 88 secured to an idler gear 90 journaled on the engine frame web 84. Idler gear 90 meshes with a gear 92 which is keyed to the left end of sleeve shaft 78 extending past the engine frame web 84. Thus, the phase changer's input shaft 78 is driven by the power piston in the same direction and at the same speed as the engine's output shaft.

In the drive connection between the phase changer's output crankshaft 82 and the displacer piston 18 there is provided an oscillatory connecting rod 94 which is journaled at its lower end on a pin 96 secured to crank 98 of crankshaft 82. Rod 94 is journaled at its upper end on a pin 100 secured to a collar 102 provided on the lower end of the displacer piston's connecting rod 60. Thus, rotation of the phase changer's output shaft 82 imparts reciprocating motion to the displacer piston 20.

The compound planetary gearing 80 enforces the angular phase relation between the phase changer's input and output shafts 78 and 82 and thus between the power and displacer mechanisms of the engine by an external power source and comprises a pair of simple, like or equal speed ratio, planetary gear sets 102 and 104. The phase changer's input and output shafts are connected to first like members of the gear sets, second like members of the gear sets are connected and one of the third like members of the gear sets is grounded and the other member is a control member for the phase changer and is connected to an external controlling power source.

In the embodiment shown in FIGURE 1 the equal speed ratio planetary gear sets 102 and 104 have their like carrier members 106 and 108 connected to shafts 78 and 82, respectively, the carrier member 106 being integral with the input shaft 78 and the carrier member 108 being keyed to the output shaft 82 at a point near the right end of shaft 82 which is suitably journaled in an engine frame web 110 as shown. The like ring gears are connected in that the ring gear teeth 112 on the interior of a drum 114 mesh with both the planets 116 of gear set 102 and the planets 118 of gear set 104, i.e. the gear sets 102 and 104 have a common internal toothed gear. The sun gear 120 of gear set 102 is keyed to the engine frame web 84 and is thus grounded and the sun gear 122 of gear set 104 is suitably journaled on the engine frame web 110 and integral with a gear 124.

The external power source for enforcing the phase relation is provided by any suitable phase change actuator which may be a bidirectional servomotor 126 as shown which is suitably mounted on the engine frame. The servomotor 126 controls the sun gear 122 and has a motor shaft 128 to which is secured a gear 130 in mesh with the gear 124 connected to sun gear 122. Servomotor 126 may be manually operated by a control 132 to hold the sun gear 122 in any angular position and also to angularly move or rotate the sun gear in either of its two possible directions. The servomotor is of conventional structure and may be of the electric, hydraulic or pneumatic type.

*Operation*

Assuming the Stirling cycle engine is operating and the servomotor control 132 is operated to hold its output shaft and thus hold the sun gear 122, the overdrive ratio provided by the gear set 102 is exactly offset by the reduction ratio of the planetary gear set 104 to provide an overall 1:1 speed ratio between the phase changer's input shafts 78 and 82. Since the speed relation between the power piston 18 and the phase changer's input shaft 78 is the same as that between the power piston 18 and the engine's output shaft 62, the displacer crankshaft 82 is driven in the same direction and at the same speed as the engine output shaft 62 to establish some fixed phase angle between the power and displacer mechanisms and thereby determine the power obtained at the engine's output shaft 62. When the sun gear 122 of the compound planetary drive is rotated or angularly moved in either of its two possible directions by control of the servomotor 126, the effective speed ratio between the phase changer's input and output shafts 78 and 82 is changed during such sun gear movement. The effective speed ratio change requires the phase changer's output shaft 82 to either speed up or slow down relative to the engine's output shaft 62 as determined by the direction and amount of angular movement of sun gear 122 to thereby change the phase relation of the engine's pistons 18 and 20 to a new value which can be fixed by again holding the sun gear 122 by the servomotor. Thus, the phase relation can be changed by the servomotor to change both engine output power and drive direction.

Included in the considerations for matching my compound planetary phase changer to the requirements of a particular Stirling engine are function, size, weight, life and cost of the compound planetary unit. Different situations cause some of these considerations to outweigh others and a final design will generally be a compromise of one or more of the objectives. In the FIGURE 1 embodiment the phase changer has a low internal torque level which is preferred so long as the gear speeds do not exceed good design practice. For example, the low torque level phase changer in FIGURE 1 can easily handle a Stirling engine having a maximum actual output power of about 280 horsepower over a speed range of approximately 200 to 1800 r.p.m. with the torque at 200 r.p.m. slightly lower than that at full engine rated speed of 1800 r.p.m. The power requirements of the compound planetary drive connecting the engine's power mechanism to the displacer mechanism would be approximately 7–10% of total engine power or about 20–30 horsepower and the phase changer could effect a phase angle change of ±90° with low internal phase changer torque levels without exceeding maximum gear speeds as determined by good design practice.

Figure 2:
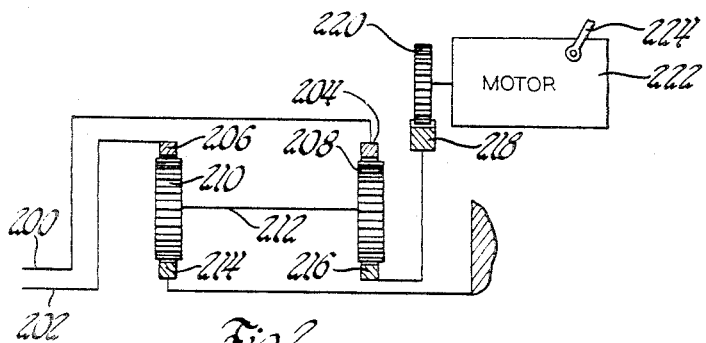

In the remaining embodiments of the phase changer shown in FIGURES 2 through 6, further compound gearing relationships of the equal ratio gear sets in accordance with the present invention are demonstrated for matching the phase changer to engines having different power, torque and speed ratings. Referring to FIGURE 2, the phase changer's input and output shafts 200 and 202 are connected to the like ring gears 204 and 206, respectively, and the planets 208 and 210 have a common supporting carrier 212. One sun gear 214 is grounded and the other sun gear 216 is connected to a gear 218 in mesh with a gear 220 connected to the servomotor 222 having the control 224.

Figure 3:
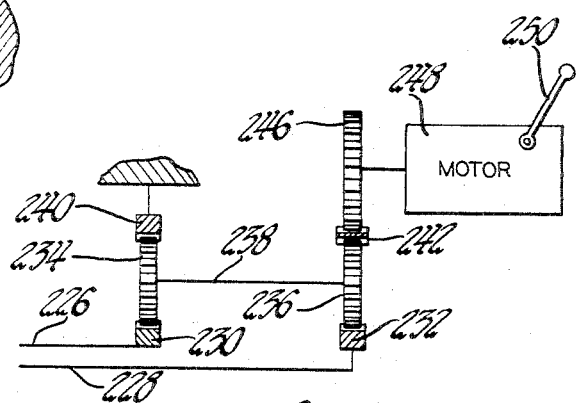

Referring to FIGURE 3, the phase changer's input and output shafts 226 and 228 are connected to the sun gears 230 and 232, respectively, and the planets 234 and 236 have a common supporting carrier 238. One ring gear 240 is grounded and the other ring gear 242 has external teeth in mesh with a gear 246 connected to the servomotor 248 having the control 250.

Figure 4:
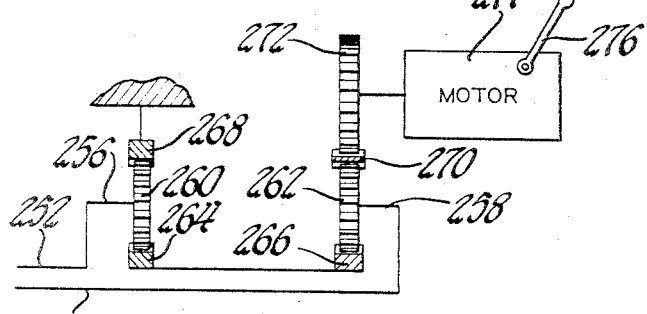

Referring to FIGURE 4, the phase changer's input and output shafts 252 and 254 are connected to the carriers 256 and 258, respectively, supporting the planets 260 and 262, respectively, and the sun gears 264 and 266 are connected. One ring gear 268 is grounded and the other ring gear 270 has external teeth in mesh with a gear 272 connected to the servomotor 274 having the control 276.

Figure 5:
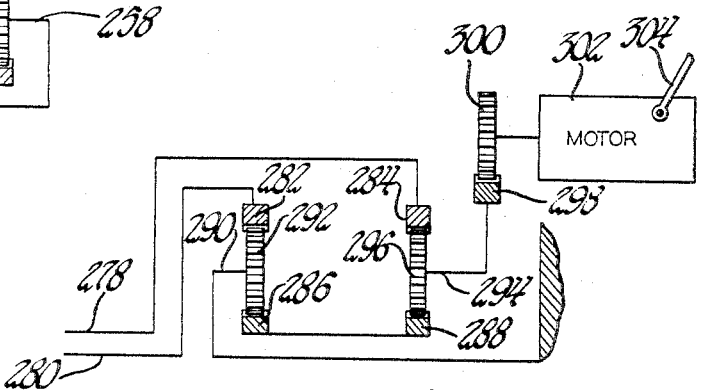

Referring to FIGURE 5, the phase changer's input and output shafts 278 and 280 are connected to the ring gears 282 and 284, respectively, and the sun gears 286 and 288 are connected. The carrier 290 supporting the planets 292 is grounded and the other carrier 294 supporting the planets 296 is connected to a gear 298 meshing with a gear 300 connected to the servomotor 302 having the control 304.

Figure 6:
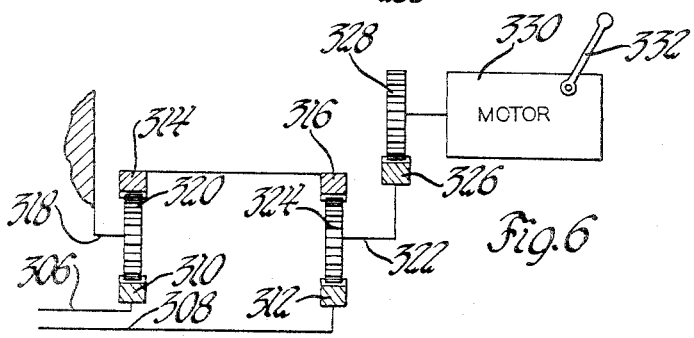

Referring to FIGURE 6, the phase changer's input and output shafts 306 and 308 are connected to the sun gears 310 and 312, respectively, and the ring gears 314 and 316 are connected. The carrier 318 supporting the planets 320 is grounded and the other carrier 322 supporting the planets 324 is connected to a gear 326 meshing with a gear 328 connected to the servomotor 330 having the control 332.

The operation of the FIGURES 2 through 6 phase changers by their respective external power sources are essentially the same as that described for the FIGURE 1 embodiment, the servomotors being operable to hold the connected planetary drive member in the compound planetary drive to fix the phase relation between the engine's power and displacer mechanisms and also being operable to drive the connected planetary drive member to effect the desired phase relation change.

In a simple planetary gear set the carrier may be assumed as having an equivalent number of teeth equal to the sum of the teeth in the sun and ring gears, and the torques in the three members of the planetary gear sets are proportional to their number of teeth and the gear speed levels are inversely proportional to the torque levels. Thus, the torque levels in the FIGURE 1 and FIGURE 4 phase changer embodiments are lowest, the torque levels in the FIGURE 3 and FIGURE 6 embodiments are highest and the torque levels in the FIGURE 2 and FIGURE 5 embodiments have intermediate values while the gear speed levels are inversely proportional to the torque levels. Furthermore, the speed levels in the FIGURES 1, 2 and 3 phase changer embodiments are lower and the torque levels are higher than those in the FIGURES 4, 5 and 6 embodiments.

Thus, a full range of compound planetary drive phase changers are made available according to my invention from which a specific embodiment can be selected in view of the above relative torque and speed levels to best meet a particular application of my phase changer.

It will be appreciated that while the invention encompasses a Stirling cycle engine having a compound planetary drive phase changing device, the phase changing device alone may have other applications such as providing the steer bias in the power train of a tracklaying vehicle where differential speeds to the tracks of the vehicle are enforced to provide a steer.

The above-described preferred embodiments of the invention are illustrative of the invention which may be modified within the scope of the appended claim.

I claim:

1. In combination, a hot gas energy transforming device having power means and displacer means, phase changer means operatively drivingly connecting said power means to said displacer means for transmitting power to drive said displacer means and for fixing and varying the phase relation of said power and displacement means, said phase changer means comprising a pair of like planetary drive sets each having a ring member, a sun member and a carrier member having a planet drivingly connecting the ring and sun members, one carrier member drivingly connected to said power means and the other carrier member drivingly connected to said displacer means, a rigid connection connecting the ring members, ground means, one sun member connected to said ground means and a power source connected to the other sun member operable to hold the connected sun member to provide a fixed phase relation between said power and displacer means and also to drive the connected sun member to change the phase relation between said power and displacer means.

References Cited

UNITED STATES PATENTS

| | | | |
|---|---|---|---|
| 748,412 | 12/1903 | Norris | 74—395 |
| 1,933,644 | 11/1933 | Trump | 74—675 X |
| 2,508,315 | 5/1950 | Van Weenen et al. | 60—24 |
| 2,577,604 | 12/1951 | Chillson | 74—675 X |
| 2,583,311 | 1/1952 | Van Heeckeren | 60—24 |
| 2,932,260 | 4/1960 | Puma et al. | 74—675 X |
| 3,301,093 | 1/1967 | Ewert | 74—675 |
| 3,315,465 | 4/1967 | Wallis | 60—24 |

FOREIGN PATENTS 366,508   1/1932   Great Britain.

DONLEY J. STOCKING, *Primary Examiner.*

THOMAS C. PERRY, *Assistant Examiner.*

U.S. Cl. X.R.

74—675; 62—6

UNITED STATES PATENT OFFICE
CERTIFICATE OF CORRECTION

Patent No. 3,416,308                  December 17, 1968

William G. Livezey

It is certified that error appears in the above identified patent and that said Letters Patent are hereby corrected as shown below:

Column 2, line 14, "elect" should read -- effect --; line 26, "phase's" should read -- phase --. Column 3, line 40, "tnd" should read -- and --. Column 6, line 27, cancel "a".

Signed and sealed this 17th day of March 1970.

(SEAL)
Attest:

Edward M. Fletcher, Jr.                  WILLIAM E. SCHUYLER, JR.

Attesting Officer                      Commissioner of Patents